Aug. 28, 1973     B. T. JOPE ET AL     3,755,522

TRIM IN PLACE DIFFERENTIAL PRESSURE THERMOFORMING PROCESS

Original Filed Sept. 25, 1969     2 Sheets-Sheet 1

INVENTORS
BRUCE T. JOPE
ALLAN R. PHILLIPS
BY
Michael J. Murphy
ATTORNEY

Aug. 28, 1973  B. T. JOPE ET AL  3,755,522
TRIM IN PLACE DIFFERENTIAL PRESSURE THERMOFORMING PROCESS
Original Filed Sept. 25, 1969  2 Sheets-Sheet 2
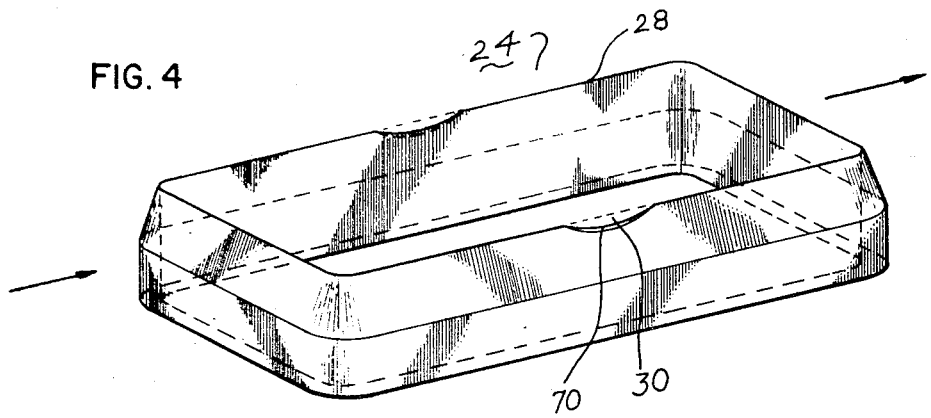
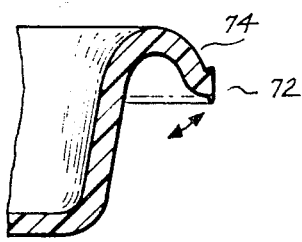
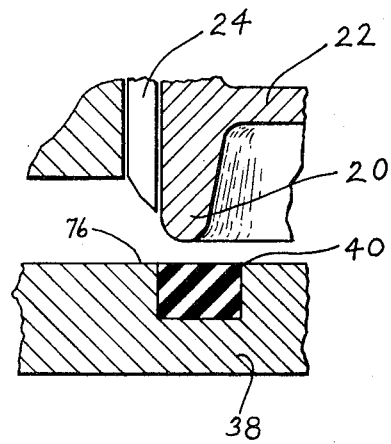
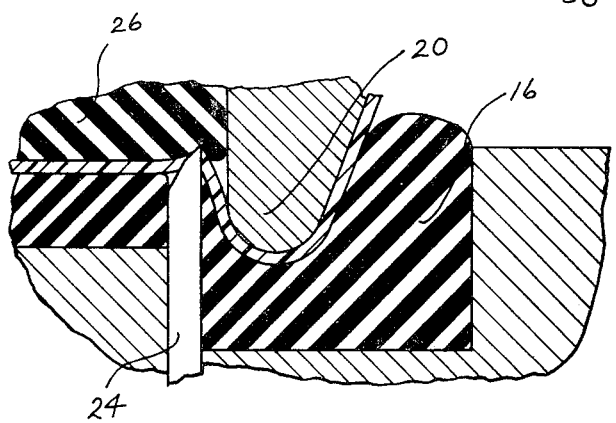
INVENTORS
BRUCE T. JOPE
ALLAN R. PHILLIPS
BY
ATTORNEY

United States Patent Office 3,755,522
Patented Aug. 28, 1973

3,755,522
TRIM IN PLACE DIFFERENTIAL PRESSURE THERMOFORMING PROCESS
Bruce T. Jope, Glastonbury, Conn., and Alan R. Phillips, Monson, Mass., assignors to Monsanto Company, St. Louis, Mo.
Continuation of abandoned application Ser. No. 860,944, Sept. 25, 1969. This application Oct. 1, 1971, Ser. No. 185,679
Int. Cl. B29c 17/04, 17/10
U.S. Cl. 264—89                         3 Claims

ABSTRACT OF THE DISCLOSURE

Method for trim in place thermoforming of articles from successive portions of a continuous sheet. Each sheet portion is sealed and a rounded flange formed therein prior to forming the container by advancing a rounded mold portion into an opposing resilient surface with the sheet interposed therebetween, while simultaneously substantially separating each sheet portion from the remainder of the sheet. Separating is by means of a blade which preferably is heated and has depressions in its surface to prevent completely separating each portion from the sheet. The blade may optionally operate against another opposing resilient surface.

---

This is a continuation of application Ser. No. 860,944, filed Sept. 25, 1969, now abandoned.

BACKGROUND OF THE INVENTION

This invention relates to forming plastic articles from sheet material and more particularly to forming portions of a continuous thermoplastic sheet into articles by a pressure differential thermoforming technique.

In recent years there has been an ever increasing utilization of thermoformed containers of synthetic plastic for packaging applications. As is well known, various techniques are employed for forming and finishing the containers from a basic sheet of stock. One technique is by pneumatic pressure differential forming of container depressions in a large section of the sheet wherein each sheet area forming a container is peripherally sealed to an opposing mold during forming and then peripherally creased further through the thickness of the sheet at the seal while still in the press. This creasing is carried out to an extent which is almost but not entirely through the web, in order that the articles may be transferred out of the forming station and thereafter easily peeled from the web along the creases by merely directing the web in a different direction from that of the containers. U.S. Pat. No. Re. 26,413 illustrates a machine operating on these principles. This type of forming is commonly referred to as a type of trim in place thermoforming, as opposed to post trim thermoforming wherein a separate trimming step is required downstream of the forming press to separate the containers from the sheet, or the trim in place technique wherein the articles are entirely severed while in the forming press and then must be individually removed therefrom. From the standpoint of speed and economy, trim in place thermoforming of the first mentioned variety is highly desirable, since the portion of the sheet or web between the container cavities is used to transport the articles out of the forming press while effectively yet just barely attached to the web, thus facilitating subsequent removal by simple peeling.

Though the equipment depicted in U.S. Re. 26,413 generally operates satisfactorily, it requires successive stroking of the sealing and creasing blades during the cycle, the first stroke causing the blade to penetrate the sheet up to about 50% of its thickness and the second stroke further penetrating up to about 95% of the sheet thickness. These consecutive movements consume a substantial portion of the overall time cycle of the forming press, which cycle is obviously desirably held to a minimum in a forming operation which depends for profit on high speed, mass production. Also, in such a plural forming installation, individual cutting and sealing blades are provided for each mold, the total of which may be as great as 24 for a single forming press. Needless to say, the extremities of these blades should lie in a common plane, in order that the sheet be equally penetrated by all the blades during the cycle. This makes planar alignment of the blades in the forming press extremely critical, and creates a recurring obligation to check and maintain this alignment for good quality operating. Otherwise the sheet portion contacted by the foremost protruding blade when the press closes may seal well, but other portions in the plural forming installation may not be sealed at all. Since the blades operate against a hard surface, their leading, cutting surfaces wear and flatten out quickly. Generally a jagged edge, as well as particles of the synthetic plastic are left on the outermost portions of the containers as a result of the crushing and fracturing of the plastic by the blades during sealing and creasing, which condition is aggravated by the continuous wearing of the sheet contacting surfaces of the blades, since the jagged edge is generally defined by the width of the leading edge of the blade. If the blades are not in perfect alignment, fracture point thickness variations will occur making container separation from the sheet variable. These container edges, if not blunted in a separate, economy reducing, downstream step, will cause problems if the container is to be overwrapped with a film, since the edges tend to fracture the easily torn film when applied across the top of the container, which thereby results in premature exposure of the contents.

Now improvements have been discovered in trim in place differential pressure thermoforming of articles from thermoplastic sheet, which eliminate deficiencies of the prior art.

Accordingly, it is a principal object of this invention to provide an improved method for trim in place, differential pressure forming of articles from a generally continuous thermoplastic sheet.

Another object of this invention is to provide a method for reducing the cycle time of such a forming process.

A further object of this invention is to provide a method for simultaneously sealing and cutting portions of the sheet in such a forming process.

Another object of this invention is to reduce the criticality of sheet penetration in such a forming process.

An additional object of this invention is to provide an improved cutting blade for use in such a process.

A still further object of this invention is to mold flanged containers by such a process without leaving a sharp, film fracturing outer edge on the flange.

Yet another object of this invention is to mold containers in such a process having downturned flanges with a substantially smooth outer edge thereon.

A further object of this invention is to reduce the wear and criticality of planar alignment of the blades in such a process.

Yet a further object of this invention is to improve the edge uniformity of a plurality of containers simultaneously formed in such a process.

Other objects of this invention will in part be obvious and will in part appear hereinafter.

SUMMARY OF THE INVENTION

These and other objects are accomplished in a trim in place, differential pressure thermoforming process for repeatedly forming articles from successive heated portions of a generally continuous thermoplastic sheet wherein each sheet portion is sealed around a mold prior to forming the articles and creased to substantially sever it from the remainder thereof, by providing the improvement which comprises forcing a portion of the container mold into a resilient surface with a sheet portion interposed therebetween to accomplish said sealing while simultaneously forcing a blade into said sheet portion to accomplish said substantial severing, said sealing and substantial severing being carried out prior to forming and reducing the overall cycle time to the extent of performing said sealing and severing simultaneously. Severing is preferably accomplished by advancing a heated blade having an interrupted peripheral cutting surface through one side of the sheet portion, preferably the side on which are located the means for heating the sheet to thus neutralize the undesirable edge characteristics otherwise formed. Blade heating is accomplished by mounting it integral with the sheet heating means. A peripheral section of each sheet portion may be compression molded by the container mold during sealing to form a turned down flange on each container.

The apparatus includes a resilient surface opposite a peripheral portion of the mold against which each sheet portion is sealed at the time of cutting. Another resilient surface is preferably located opposite each cutting blade to compensate for any irregularities in blade alignment. The blade preferably has a sharp cutting edge which has a plurality of depressions therein in which areas the blade does not cut the sheet when advanced into it.

BRIEF DESCRIPTION OF THE DRAWINGS

In describing the overall invention, reference will be made to the accompanying drawings in which:

FIG. 4 is a perspective view of the improved cutting blade of the invention;

FIG. 5 is a vertical, sectional view of the side wall and flange of a container formed by the apparatus of FIG. 1; and FIGS. 6 and 7 are schematic views of alternative arrangements of the appaartus of the invention.

DESCRIPTION OF THE PREFERRED EMBODIMENTS

Figure 1:
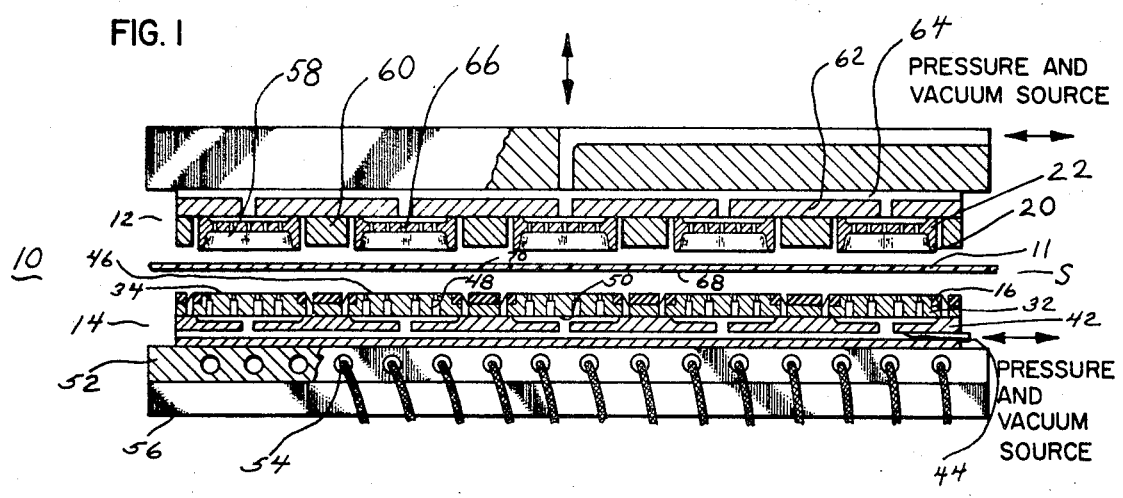
FIG. 1 is an elevational, schematic view of one form of the appartaus of the invention prior to the start of a cycle.

With reference to the drawings wherein identical numerals refer to identical parts, there is shown in FIG. 1, major apparatus components for repeatedly forming plastic articles, such as trays, from successive portions of a generally continuous flexible plastic sheet. This apparatus includes a forming press generally indicated as 10, having mold means 12 for forming heated, softened thermoplastic sheet portions into molded shapes such as containers. Mold means 12 is herein meant to include the apparatus components located above thermoplastic sheet portion 11 within forming press 10 in FIG. 1. Heated plate means 14 are provided within press 10 for heating each successive sheet portion prior to forming. Plate means 14 is herein meant to include the apparatus components located in FIG. 1 on the lower side of sheet portion 11. Means are provided (not shown) for reciprocating one of either mold means 12 or heated plate means 14 toward the other during the forming cycle. Sheet advancing means (not shown) are also provided for advancing each sheet portion 11 through press 10. Such reciprocating means and sheet advancing means may take the form shown in U.S. Pat. No. Re 26,413.

Means are provided in press 10 for sealing plural areas of each portion 11 of sheet S prior to forming and for substantially but not completely severing each area from the remainder of the sheet after the articles have been formed. These means comprise a resilient member 16 made of a material such as rubber, polyurethane etc. having a resilient surface 18 for cooperation with an opposing protruding nose portion 20 extending around the periphery of mold 22.

A series of blades 24 are provided, each of which cooperates and is associated with the peripheral nose portion 20 of an opposing mold 22. In one form of the invention, blades 24 are mounted on the lower side of sheet portion 11 (FIGS. 1 and 2) integral with the means 14 for heating each sheet portion 11, with the molds 22 mounted on the upper side of sheet portion 11. In another form of the invention (FIG. 6) the baldes 24 surround and are mounted on the same side of sheet portion 11 as are the molds 22. In yet another form of the invention, an additional resilient piece 26 is provided between adjacent molds 22 for cooperation with blades 24, which in this case are on the lower opposite side of sheet portion 11.

Each blade 24 (FIG. 4) has a leading edge 28 which is its cutting surface and which generally extends around the full periphery of the blade. Each edge or cutting surface 28 has a pair of substantially oppositely situated depressions 30 whereat each area of sheet portion 11 remains attached to the remainder of sheet portion 11 after the blade 24 has advanced into the sheet.

Figure 2:
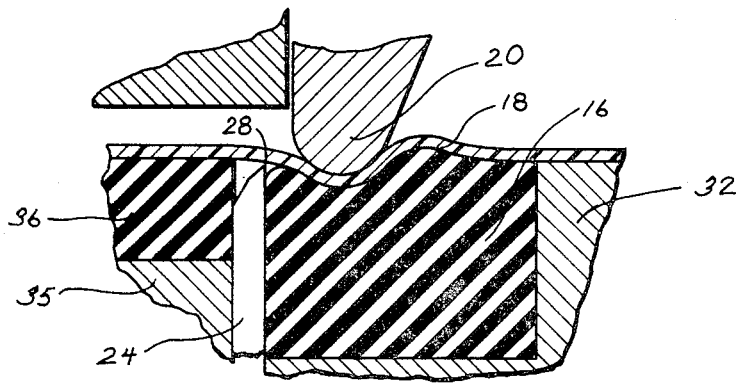
FIGS. 2 and 3 are partial, schematic views illustrating successive positions of the apparatus of FIG. 1 during a forming cycle.

In the embodiment of FIGS. 1 and 2, the means 14 for heating each sheet portion 11 includes a series of forms 32, the periphery of each generally dimensionally conforming to that of an opposing mold 22. Each form 32 is positioned opposite a mold 22 with a plurality of such pairs positioned across the length and width of forming press 10, the illustration of FIG. 1 depicting only a single row of such components. Spacer plates 35, each likewise having a resilient pad 36 on its upper surface, are positioned intermediate blades 24. With the arrangement of FIG. 6, wherein the blades 24 are on the same side of the sheet as the molds 22, a series of forms 32 are unnecessary, and one large platen 38 may be utilized having resilient pads 40 positioned in suitable channels in its upper or forward end.

Each form 32 has a peripherally extending recess formed therein for holding resilient member 16. The latter may be secured in the recess by any suitable conventional means such as an adhesive. The depth of the recess in which a member 16 is situated is such that in the secured, relaxed position of member 16, its upper surface is in the same plane as that of leading surface 34 of a form 32. Similarly, the outermost tip of each blade 24 is likewise substantially in the same plane as or below surface 34 of form 32.

Forms 32 and spacer plates 35 are mounted by suitable conventional means on baffle plate 42 of heated plate means 14. Baffle plate 42 has suitable channels 44 formed therein, connected by conventional valve means not shown to pneumatic pressure and vacuum supply sources. These channels communicate with surface 46 of heated plate means 14 through a series of small holes 48 bored in each form 32 extending from surface 46 to lower surface 50. Baffle plate 42 is in turn mounted on heating platen 52 having conventional cartridge type resistance heaters 54 embedded therein for increasing the temperature of platen 52, as well as that of baffle plate 42 and each of forms 32 which are in heat conductive contact with heating platen 52. Platen 52 may in turn be mounted on a suitable support plate 56.

Situated on the other side of sheet portion 11, each mold 22 of mold means 12 has a cavity 58 aligned opposite a form 32, with cavity 38 generally conforming in surface contour to that of a shallow tray. Mold means 12 further comprises a series of anvil portions 60 surrounding each mold and aligned opposite one or more of blades 24. Anvil portions 60 serve to support the periphery of each sheet section of portion 11 being formed into a container during its penetration by a blade 24. As further conventional portions of mold means 12, there is provided support frame 62 having channels typically indicated as 64 formed therein connected by conventional valve means, not shown, to suitable sources of pneumatic pressure and vacuum, in a manner similar to that associated with plate means 14. Each mold 22 has a series of small holes 66 connecting its inner and outer surfaces, by means of which pressure or vacuum is applied to the molding surfaces through channel 64.

In operation, a portion of a generally continuous thermoplastic sheet S, such as that identified as 11 within the limits of forming press 10 in FIG. 1, is caused to advance from a suitable source into forming press 10 between mold means 12 and heated plate means 14, by means of a conventional sheet advancing mechanism. When such a portion 11 of the sheet is positioned within press 10, a partial vacuum is applied through holes 48 in forms 32, while a pressure in excess of atmospheric is applied through holes 66 in molds 22, to force side 68 of sheet portion 11 into intimate contact with the exposed upper surface 34 of each form 32 as well as with the upper surfaces of resilient pads 16 and 36 of forms 32 and spacer plates 35 respectively. Surfaces 20 are at elevated temperature e.g. generally between about 175 to 350° F., but dependent on the type of thermoplastic being formed, as a result of their conductive association with heaters 34. After each section of sheet portion 11 which is to form a container reaches a sufficient temperature such that it may be readily pneumatically drawn, or preferably at the start of the imposition of reduced pressure on side 68 of sheet portion 11, mold means 12 is caused to reciprocate downwardly by conventional actuating means, not shown. This causes anvil portions 60 of mold means 12 to press against side 70 of sheet S and thereby force side 68 of sheet S into the leading edges 28 of blades 24. This results in passage of edge 28 of blades 24 entirely through the full thickness of the sheet to substantially sever the section of sheet portion 11 within the peripheral confines of each blade 24 except at the portions of the sheet opposite depressions 30 in leading edge 28 of the blades. The depth of each depression 30 is such that when leading edge 28 has passed through the sheet and is in contact with the surface of each opposing anvil portion 60, bottom face 70 of the depressions has not penetrated the sheet completely.

Figure 3:
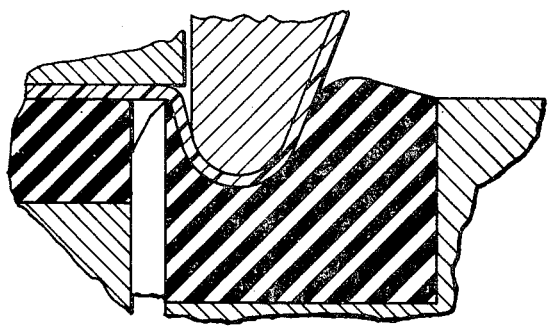

Prior to penetration by blades 24, nose portion 20 of each mold 22 is forced by the closing movement of the press into side 70 of sheet portion 11. Further movement as illustrated in FIGS. 2 and 3 by nose portion 20 depresses opposing resilient pad 16 such that when the sheet is substantially severed by blades 24, each portion of sheet section 11 which is to form a container is sealed between a nose portion 20 on one side and a resilient pad 16 on the other side, yet is entirely severed from the sheet immediately adjacent the seal except at the depressions 30 of blades 24. Thus a second reciprocatory movement toward each other of the opposing mold and heating plate portions of the forming press is avoided due to the simultaneous sealing and severing during a single stroke of the apparatus, and accordingly the cycle time is therefore reduced.

Simultaneously or immediately thereafter, the pressure and partial vacuum being applied to either side of sheet portion 11 are reversed, such that reduced pressure is exerted through holes 66 in molds 22 and pressure in excess of atmospheric is applied through holes 48 in forms 32 to forcibly snap each section of sheet portion 11 confined within a nose portion 20 into contact with the surface of the cavity in its oppositely aligned mold 22.

After this occurs, the pressure acting on the surfaces of molds 22 is increased to above atmospheric so as to force the formed containers from the molds, whereupon one of either mold means 12 or heated plate means 14 is moved away from the other and sheet portion 11 with the plurality of flanged containers still attached therein is advanced out of press 10 by the sheet advancing means, thereby causing a subsequent portion of the generally continuous sheet to move into place within the forming press for the start of the next cycle. The tabs formed by depressions 30 which are holding the containers in the sheet are then broken so as to separate the formed containers from the sheet portion 11 as generally indicated in U.S. Re. 26,413, by causing the web of sheet portion 11 between the containers to move in one direction while preventing the containers from moving in that direction, as by advancing the web through the nip of opposing advance rolls.

As can be appreciated, by mounting the blades used to substantially sever each sheet portion in intimate contact with the heated plate means, these blades achieve essentially the same temperature as that of surfaces 46 used to render each sheet portion malleable, and which is elevated in comparison with that of molds 22. As depicted in FIG. 5, projection 72, which would otherwise appear as a jagged edge extending outwardly in the same direction as flange 54 and which is caused by the crushing and rupturing of the plastic during penetration by blades 24, is now blunted such that its tendency to fracture an overwrap later applied around the tray is substantially reduced or eliminated. Flange 74 is compression molded in a peripheral portion of the sheet during the closing of the press as a result of nose portion 20 of each mold moving into the opposing resilient pad 16.

In the embodiment of FIG. 6, the leading edge of severing blade 24 enters sheet S from the same side as that engaged by nose portion 20, and abuts against surface 76 of plate 38 of heated plate means 14 when the press is fully closed. Otherwise simultaneous substantial severing and sealing occurs as in the embodiment of FIGS. 1–3. The embodiment of FIGS. 1–3, however, is preferred when forming containers which are to be overwrapped with film, since the action of the blade entering the sheet through the side which is to form the inside of the container (FIGS. 1–3) tends to yield an edge more in the vertical plane (FIG. 5) and protruding outwardly to a lesser extent than that obtained when the blade enters through the side which is to form the outer surface of the container (FIG. 6).

In the embodiment of FIG. 7, blade 24 operates against an opposing resilient pad 26 in the same manner in which nose portion 20 coacts with resilient pad 16. Thus, in this embodiment, if blades 24 in the plural forming press are not all substantially aligned in a common plane, any misalignment will be taken up as a result of the blades operating against resilient pad 26, such that each portion of sheet section 11 within the press is substantially severed from the remainder of the sheet to the same extent as every other portion.

The above description and particularly the drawings are set forth for illustration purposes only and are not to be taken in a limited sense.

The blade utilized in the present invention must have a relatively sharp leading edge to accomplish substantial severing of each sheet portion, as opposed to being blunt. Though not essential, it is preferable that it be at an elevated temperature which is substantially greater than that of the container molds, which themselves should be unheated in order to set the plastic of the formed containers as rapidly as possible. Because of the intimate contact between the cutting blade with the heated surface used to soften the sheet for drawing, the blades will generally assume the same temperature as this heated surface, which for the majority of thermoplastics is between 175 to 350° F. with contact being maintained for about 2 to 4 seconds. It is, however, essential that the depressions in the cutting edge of each blade be in the portion of the blade periphery which is parallel or substantially parallel to the direction of sheet movement through the forming press rather than in the portion of the periphery which is perpendicular to sheet movement. This is depicted in FIG. 4 wherein the arrows indicate the direction of sheet movement and depressions 30 are formed in the sides of the blade which are parallel to the arrows. This is important because if the depressions which are the only means of holding the article in the sheet after formation, are in the portion of the periphery perpendicular to sheet movement or to the axis of the sheet, the article will tend to be drawn down into the nip of the sheet advance rolls, which (see Re. 26,413) are below the plane of and are at right angles to the sheet movement. This would cause the articles to be crushed, whereas if this portion of the periphery is fully cut out of the sheet, it will proceed on in the direction of movement and sequentially commence peeling away from the remainder of the sheet to eventually become separated therefrom.

The present invention may be effectively utilized to shape a turned down flange on a container or to neutralize the effect of a sharp edge on the flange of a container formed in a high speed trim in place, differential pressure thermoforming operation. The invention is especially applicable in forming containers which will be later overwrapped with a delicate film covering.

It is obvious that many variations may be made from that herein set forth without departing from the spirit and scope of the invention.

What is claimed is:

1. In a trim in place, differential pressure thermoforming process for repeatedly forming articles in a forming station from successive heated portions of a generally continuous thermoplastic sheet by sealing each sheet portion around a mold prior to forming the articles and creasing each sheet portion while in said forming station to substantially sever it from the remainder of the sheet, the improvement which comprises forcing, at the beginning of a single continuously applied stroke, a portion of each mold into a resilient surface with a peripheral section of each sheet portion interposed therebetween to accomplish a sealing of said peripheral section and while continuing the forcing of said section further into the resilient surface to closed condition of said mold, simultaneously forcing a relatively sharp heated blade having an interrupted peripheral surface through the full thickness of each sheet portion around a major portion of the periphery thereof except opposite the interruptions in the peripheral surface of the blade to accomplish said substantial severing, said sealing and substantial severing operation being carried out prior to completing the forming by differential pressure and reducing the overall cycle time to the extent of performing the sealing and severing simultaneously during said single stroke.

2. The process of claim 1 wherein said blade is introduced through the side of the sheet portion on which are located means for heating said sheet portion.

3. The process of claim 2 wherein a peripheral section of said sheet portion is compression molded by the container mold during sealing to form a turned down flange on each container.

References Cited
UNITED STATES PATENTS

| | | | |
|---|---|---|---|
| 2,702,411 | 2/1955 | Winstead | 264—89 |
| 3,175,027 | 3/1965 | Harrison | 264—163 X |
| 3,594,464 | 7/1971 | Ihde | 264—163 |
| 3,240,851 | 3/1966 | Scalora | 264—163 X |
| 3,518,334 | 6/1970 | Carrigan et al. | 264—160 X |
| 3,466,214 | 9/1969 | Polk et al. | 264—163 X |
| 2,954,725 | 10/1960 | Palmer | 18—19 BM X |
| 2,190,659 | 2/1940 | Guerin | 18—DIG. 44 |
| 3,342,914 | 9/1967 | Edwards | 264—92 X |
| 2,926,385 | 3/1960 | Willson, Jr. | 264—89 |
| 2,295,066 | 9/1942 | Weikert | 264—90 |

FOREIGN PATENTS

| | | | |
|---|---|---|---|
| 191,152 | 9/1956 | Austria | 264—313 |
| 1,136,613 | 12/1968 | Great Britain | 264—89 |

DONALD J. ARNOLD, Primary Examiner

J. H. SILBAUGH, Assistant Examiner

U.S. Cl. X.R.

264—92, 93, 163, 313; 425—292, 388